Sept. 6, 1932.   G. H. THATE   1,875,678
CITRUS FRUIT JUICE EXTRACTOR
Filed Sept. 8, 1931
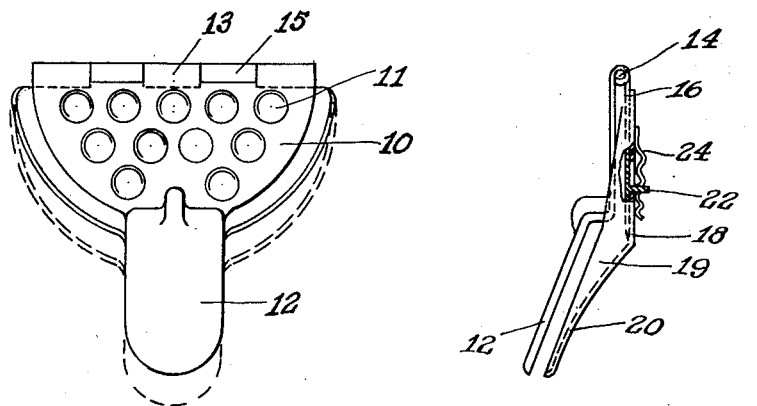
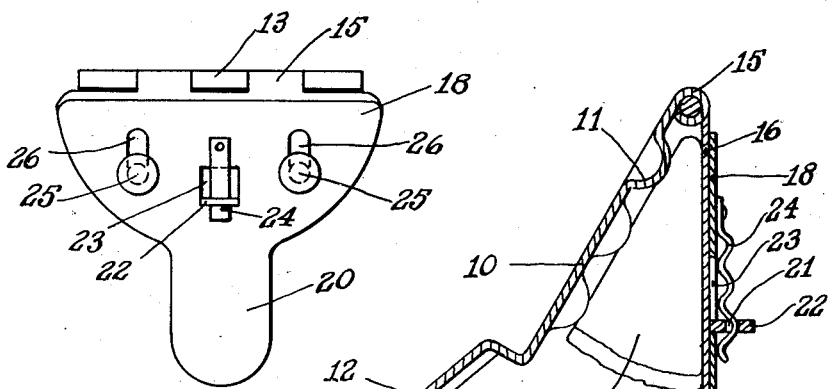
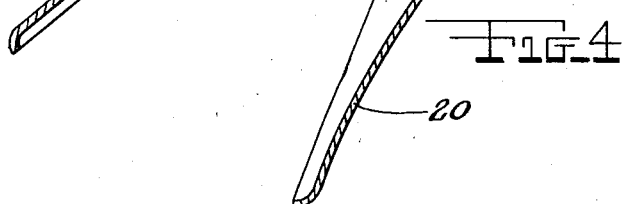
Inventor
G. H. Thate
By his Attorney J. Ledermann Patented Sept. 6, 1932

1,875,678

UNITED STATES PATENT OFFICE

GEORGE H. THATE, OF BELLEVILLE, NEW JERSEY

CITROUS FRUIT JUICE EXTRACTOR

Application filed September 8, 1931. Serial No. 561,673.

The main object of this invention is to provide a device with which the juice may be extracted from quartered or divided citrous fruits by a clenching movement of the hand in the manner of a lemon-squeezer, the device being particularly applicable to table use.

Another object of the invention is to provide a juice extractor for citrous fruits, which is constructed in the form of two mutually hinged jaws upon one of which the section or slice of fruit is laid, the juice being removed by a closing pressure on the jaws applied by the hand.

Still another object of this invention is to provide a juice extractor for citrous fruits, having two jaws, one of which is so constructed as to be capable of having its area enlarged in order to accommodate various kinds and sizes of citrous fruits, such as, for instance, lemons and oranges.

The above and other objects will become apparent in the description below, in which characters of reference refer to like-named parts in the drawing.

Referring briefly to the drawing, Figure 1 is a top plan view of the device as it lies on a flat surface, showing the device in closed position.

Fig. 2 is a partly sectioned side elevational view of Fig. 1, showing particularly the adjusting means.

Fig. 3 is a bottom plan view of the device.

Fig. 4 is an enlarged sectional elevational view of the device, showing a quartered fruit section between the jaws.

Referring in detail to the drawing, the numeral 10 indicates the plate of the auxiliary jaw. This plate is semi-circular in outline, and over its entire surface, dished-out hemispherical depressions 11 are formed. A handle or arm 12 extends radially from one position on the plate 10. The straight edge of the plate 10 is formed into hinge sleeves 13 which are mutually aligned and receive a pin 14. The sleeves 13 are in spaced-apart relation with each other and receive between them cooperating hinge sleeves 15 of the main extractor jaw 16, the latter being semi-circular in outline but somewhat larger than the plate 10. The curved edge of the main jaw is champhered as indicated by the numeral 17, so that the edge of the jaw presents no shoulder. An adjustable apron 18, which may be shifted, is provided. This apron is also of semi-circular outline and has a similarly-formed rim 19 thereon, the rim tending to strengthen the apron. The latter is provided with a manipulating arm 20 in which the arm 12 registers when the device is in closed position. An ear 22 extends from the jaw 16 and is provided with a slot 21. This ear is movable in an aperture 23 formed in the apron 18. A resilient corrugated finger 24 is secured at one end of the apron aperture by any desirable means and the free end of said finger passes through the slot in the ear, and releasably and adjustably locks the apron to the main jaw. To retain the apron 18 secured to the main jaw 16, rivets 25 are attached to the main jaw and pass through slots 26 in the apron. The rivets are provided with enlarged heads so that shoulders are provided to retain the apron in secured position on the main jaw 16.

The device is used for extracting the juice from a slice or section of citrous fruit with the device held between the fingers. The fruit section is laid upon the main jaw 16, and the plate 10 is rotated about the hinge until it rests upon the fruit. Pressure of the fingers on the arms 12 and 20 will close the two jaws and squeeze the juice out of the fruit.

To accommodate the device for fruits of various sizes, the main jaw 16 is so constructed, as described, so that its area may be increased or diminished. The apron 18 may be slid along the main jaw 16 to thus vary the area, and it may be releasably locked in various positions by means of the corrugated finger 24 which passes through the slot 21 in the ear 22, the latter being rigid with the main jaw and movable in the aperture 23 of the apron. After the apron is thus slid along the main jaw to the desired position, the corrugations of the finger engage the ear 22 and releasably interlock the apron and the main jaw in the new position.

It is to be noted that certain changes in form and construction may be made without departing from the spirit and scope of the invention.

I claim:

1. In a juice extractor, a pair of jaws mutually hinged, arms on said jaws, means for increasing the area of one of said jaws, and means for adjustably interlocking said jaw with said first-named means.

2. In a juice extractor, a pair of mutually hinged jaws, an arm extending from one of said jaws, an apron slidably attached to the other of said jaws, a second arm extending from said apron, rivets slidably locating said apron on said jaw, and means on said jaw and apron for releasably interlocking said jaw and apron in various positions.

3. In a juice extractor, a pair of mutually hinged jaws, an arm extending radially from one of said jaws, an apron slidably attached to the other of said jaws, a second arm extending from said apron, rivets slidably securing said apron to said jaw, said apron having an aperture therein, a slotted ear on said jaw passing through said aperture, and means on said apron passing through said slot for releasably locking said apron to said jaw in various positions.

4. In a juice extractor, a pair of mutually hinged jaws, an arm extending radially from one of said jaws, an apron having an aperture therein slidably attached to the other of said jaws, a second arm extending from said apron, rivets slidably securing said apron to said jaw, a slotted ear on said jaw passing through said aperture, a corrugated resilient finger mounted on said apron, said finger passing through said slotted ear, said finger being adapted to be distended in said slotted ear upon shifting of said apron to vary the area of said jaw.

5. In a juice extractor, a pair of jaws mutually hinged, arms on said jaws, means for increasing the area of one of said jaws, and means for releasably interlocking said jaw with said first-named means.

6. In a juice extractor, a pair of jaws mutually hinged, an apron slidably mounted on one of said jaws for increasing the area of said jaw, and means for releasably interlocking said apron with said jaw.

7. In a juice extractor, a pair of jaws mutually hinged, and means for increasing the area of one of said jaws.

In testimony whereof I affix my signature.

GEORGE H. THATE.